(12) United States Patent
Barthel et al.

(10) Patent No.: US 6,356,795 B1
(45) Date of Patent: Mar. 12, 2002

(54) SYNCHRONIZATION METHOD

(75) Inventors: Herbert Barthel, Herzogenaurach; Heiner Fuchs; Alfons Göbel, both of Erlangen, all of (DE)

(73) Assignee: Seimens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,672

(22) PCT Filed: Jun. 3, 1997

(86) PCT No.: PCT/DE97/01109

§ 371 Date: Dec. 18, 1998

§ 102(e) Date: Dec. 18, 1998

(87) PCT Pub. No.: WO97/50024

PCT Pub. Date: Dec. 31, 1997

(30) Foreign Application Priority Data

Jun. 24, 1996 (DE) .......................................... 196 25 195

(51) Int. Cl.⁷ ................................................. G05B 9/02
(52) U.S. Cl. ............................. 700/82; 709/40; 714/12
(58) Field of Search ........................... 700/2, 3, 79–82; 709/248, 400; 714/11–13

(56) References Cited

U.S. PATENT DOCUMENTS 4,674,036 A  6/1987 Conforti ..................... 364/200
5,384,906 A * 1/1995 Horst ......................... 709/400

FOREIGN PATENT DOCUMENTS

| DE | 41 04 114 | 8/1992 |
| DE | 44 01 467 | 9/1994 |
| DE | 44 01 468 | 9/1994 |
| DE | 44 05 297 | 8/1995 |
| EP | 0 316 087 | 5/1989 |
| EP | 0 394 514 | 10/1990 |
| EP | 0 497 147 | 8/1992 |
| EP | 0 616 274 | 9/1994 |

\* cited by examiner

*Primary Examiner*—William Grant
*Assistant Examiner*—Steven R. Garland
(74) *Attorney, Agent, or Firm*—Staas & Halsey, LLP (57) ABSTRACT

A synchronization method for a redundant automation system composed of at least two subsystems is provided, where these subsystems execute functionally identical sequences of machine instructions, said sequences of functionally identical machine instructions having increment instructions at corresponding locations for incrementing a synchronization counter. Synchronization is performed on the basis of the value of a synchronization counter at least when one subsystem registers a special event. To do so, a synchronization counter target value is determined so that the subsystems interrupt the execution of the sequence of machine instructions on attaining a synchronization position at which the values of the respective synchronization counters attain the synchronization counter target value.

23 Claims, 6 Drawing Sheets

SYNCHRONIZATION METHOD

FIELD OF THE INVENTION

The present invention relates to a synchronization method for a redundant automation system having at least two subsystems, where the minimum of two subsystems have a minimum of one processor, are linked together via communication means, execute functionally identical sequences of machine instructions to control a process and synchronize with one another from time to time via the communication means.

BACKGROUND INFORMATION

Synchronization methods for automation systems are generally conventional. European Patent 497 147 describes a method in which the subsystems of an automation system composed of two subsystems synchronize one another after a period of time preselectable by the user at the latest. European Patent 616 274 describes a similar method where synchronization is performed as a function of the actual run time of a sequence of machine instructions. Thus, it is necessary to know the run times of the instructions of the user program and to constantly add up these run times. The conventional methods are not optimal inasmuch as an unnecessarily long amount of time is spent for synchronization.

An object of the summary present invention is to provide a synchronization method with minimal complexity for an automation systems composed of at least two subsystems. The synchronization method independent of the presence of special hardware. The synchronization method according to the present invention has the least possible negative effect on the computing capacity of the automation system.

The synchronization method is based on a counter for each of the subsystems—hereinafter called synchronization counters—which is incremented, i.e., increased by one, using increment instructions. Incrementation is an especially simple task for a processor. In individual cases, incrementation can take place within a single clock cycle and therefore especially rapidly.

Synchronization is performed at least when one of the minimum of two subsystems—hereinafter referred to as the alerted subsystem—registers a special event, e.g., an interrupt or an alarm. In this case, the alerted subsystem relays to the minimum of one other subsystem the instantaneous value of its synchronization counter. This relaying informs the minimum of one other subsystem that a special event has occurred. The minimum of one other subsystem in turn relays to each other subsystem the instantaneous value of its synchronization counter. Each of the subsystems is thus informed of the instantaneous value of its own synchronization counter as well as the value of the synchronization counter of the minimum of one other subsystem.

At the time of occurrence of the special event, one of the subsystems may be ahead of the minimum of one other subsystem in executing the sequence of machine instructions. If this is the case, it is also possible for the subsystem which is in the lead to have already executed a larger number of increment instructions, so that the values of the synchronization counters of the subsystems differ.

Each subsystem determines the largest value at the moment from the value of its own synchronization counter and the value of the synchronization counter of the minimum of one other subsystem. The value of the synchronization counter which all subsystems can attain together by continuing to execute the sequence of machine instructions is the largest value of the synchronization counter increased by one, i.e., incremented. Therefore, in each subsystem, the largest value of the synchronization counters of all subsystems is incremented. This value which is the same for all subsystems is hereinafter referred to as the synchronization counter target value. This can, of course, also be determined by an alternative method by first incrementing the values of the synchronization counters and then determining the synchronization counter target value as their maximum value.

The subsystems interrupt the execution of the sequence of machine instructions on attaining the position of the increment instruction (hereinafter referred to as synchronization position) at which the values of the respective synchronization counters attain the synchronization counter target value. Since the increment instructions occur at corresponding locations in the functionally identical sequences of machine instructions, the increment instructions are consequently especially suitable as the potential synchronization position.

The fact that such a synchronization position has been attained can be determined especially easily by comparing the value of the respective synchronization counter with the synchronization counter target value. The synchronization method is thus based on incrementation and comparison operations, which can be carried out especially rapidly and efficiently by a processor.

Since both subsystems can attain their synchronization positions at different times, each subsystem signals the minimum of one other subsystem that the synchronization position has been attained by sending a synchronization signal. Each subsystem then waits for arrival of the synchronization signal from the minimum of one other subsystem. This signals that it has attained its synchronization position. In the case of more than one other subsystem, each subsystem waits for arrival of the synchronization signal from all other subsystems, so that each subsystem executes additional actions only when all subsystems have attained the synchronization position. However, there are also conceivable applications where no synchronization signal is exchanged on attaining the synchronization position.

After attaining the synchronization position, and after registering the synchronization signal from the minimum of one other subsystem, each subsystem determines a specific response for the special event and performs it. This response is a specific sequence of machine instructions for the special event. Then, each subsystem continues executing the sequence of machine instructions, the execution of which was reset on attaining the synchronization position because of the synchronization and because of the response to the special event.

The alerted subsystem relays the special event to the minimum of one other subsystem immediately after registering the special event at the earliest, e.g., in conjunction with relaying the instantaneous value of the synchronization counter, but at the latest in conjunction with the synchronization signal.

There are also cases where exchanging or waiting for the synchronization signal does not take place for the specific response for the special event to be executed. In such a case, the special event-specific response is carried out immediately on attaining the synchronization position. Then, there is no time synchronization, but the method according to the present invention ensures that although the special event-specific response will not be carried out at the same time but at functionally identical positions within the sequence of machine instructions of the respective subsystem. In this way, the desired synchronization is ensured, because the synchronization positions are arranged at corresponding positions in the sequences of functionally identical machine instructions.

The synchronization position can be attained especially efficiently if the address of each machine instruction of the sequence of machine instructions, in particular the address of the machine instruction being carried out at the moment, and the address of the machine instruction corresponding to the synchronization position can be determined.

This makes it possible for the address of the machine instruction being carried out at the moment to always be compared with the address of the machine instruction corresponding to the synchronization position when executing the sequence of machine instructions—at least after the alerted subsystem has registered a special event. If the two addresses compared are found to match, the synchronization position has been attained. In this way, execution of the sequence of machine instructions can be interrupted precisely on attaining the synchronization position.

For the case when the synchronization position lies within a subsequence of the sequence of machine instructions which is to be repeated conditionally or unconditionally, the individual machine instructions are processed repeatedly. However, the position of an increment instruction does not become a synchronization position until the synchronization counter has attained the synchronization counter target value in executing the increment instruction. Therefore, in the case of loops, an increment instruction may be processed repeatedly in the loop, but not become the synchronization position until after a certain number of processing operations. Thus it is not sufficient in this case to determine the address of the increment instruction. In this case the synchronization position is not attained until the address of the machine instruction being carried out at the moment matches the address of the machine instruction corresponding to the potential synchronization position while at the same time the synchronization counter matches the synchronization counter target value.

If, as described above, the address of each machine instruction can be determined, a break point can also be associated with the synchronization position, so that execution of the sequence of machine instructions is interrupted exactly at the synchronization position. Then the processor directly assumes the function of checking whether the synchronization position, i.e., the address associated with the break point, has been attained. Usually, with processors from Intel, such as the i80386, i80486, Pentium, etc. processors—an interrupt is triggered on attaining the address associated with the break point, and its occurrence indicates unambiguously the fact that the address in question has been attained.

If the processor can be operated in a single-step mode, then it is also possible as an alternative to always compare the address of the machine instruction being carried out at the moment with the address of the synchronization position in executing the sequence of machine instructions, at least after the alerted system has registered a special event. If a match is found, the synchronization position has been attained and processing of the individual instructions in the sequence of machine instructions is interrupted.

According to the present invention, another efficient option for attaining the synchronization position is for the value of the synchronization counter to be compared, on an ongoing basis, with the synchronization counter target value in executing the sequence of machine instructions, at least after the special event has been registered by the alerted subsystem, and for the execution of the sequence of machine instructions to be interrupted when the value of the synchronization counter target value is attained. To do so, a first memory location and a second memory location are determined, with the value of the synchronization counter being stored in the first memory location and the synchronization counter target value being stored in the second memory location. With conventional processors, specifically the aforementioned Intel processors, the processor can be programmed so that execution of the sequence of machine instructions is interrupted as soon as the contents of the first memory location match the contents of the second memory location. This special functionality of the processor has previously been utilized for diagnostic programs, also known as debuggers, in particular. It may of course also be used to attain the synchronization position.

The positions of the increment instructions within the sequence of machine instructions may be defined according to different strategies. If the sequences of machine instructions are generated from instruction sequences of a programming language, it is advantageous to insert the increment instructions during the conversion of instruction sequences into machine instruction sequences. However, the scope of the present invention also includes inserting the increment instructions into the machine instruction sequence by relocating after the latter have been generated but before they are executed.

If the sequences of instructions are sequences of instructions in a programming language, with the instruction sequences that belong together being combined in a block, the increment instructions are inserted into the sequence of machine instructions at least at one of the limits of the block. Examples of such programming languages include all "structured" programming languages, such as Pascal, PEARL, C/C++, etc., which have language conventions for defining a block, with specific language resources also implicitly defining a particular block.

Increment instructions are always to be inserted in conjunction with all jump instructions, e.g., conditional and unconditional jump instructions, as is also the case in the related art according to European No. 497 147 A. Jump instructions are understood to refer to all instructions and commands from high-level languages which lead to a conditional or unconditional jump on a language level directly understandable to the processor. This is necessary because increment instructions might be skipped due to a jump. In particular, it would be conceivable for only machine instructions between two increment instructions to be executed due to a jump over a long period of time, possibly even an unlimited period of time, so that no increment instructions would be executed during this period of time. In this case, no potential synchronization positions would be attained accordingly, so that synchronization could not be performed. Therefore, the increment instructions are inserted frequently, but not necessarily before such a jump instruction.

In the case of call-up of subroutines, it is advantageous if the increment instructions are inserted within the subroutine, i.e., at the beginning of the subroutine and at the end of the subroutine. This makes insertion of the increment instructions into the sequences of machine instructions much simpler in an advantageous manner, because call-up of a subroutine is not always clearly recognizable, but the start and end of a subroutine are. CALL and RET instructions can be given as examples of Assembler programming language, each triggering a jump to a subroutine or a return from a subroutine.

In the case of programmable controllers whose specific programming languages usually do not offer any language resources for a block-oriented structuring, the increment instructions are always to be inserted before jump instructions. Specifically in the case of programmable controllers, the sequence of machine instructions is often structured by way of modules. A module is thus to be regarded as a specific embodiment of a block. The change of modules which becomes necessary in executing the sequence of machine instructions of a programmable control is implemented with the help of jump instructions, so here again, inserting increment instructions before a jump instruction leads to the desired result. The same thing is also true in a similar manner for programming languages such as Assembler or BASIC which have little or no structuring.

In addition, the increment instructions can also be inserted into the sequence of machine instructions after a fixed number of individual instructions of the sequence of machine instructions, in particular after a number of instructions that are preselected by the user. A sequence of machine instructions preselected in this way has the advantage that the average period of time between the occurrence of two increment instructions always remains approximately the same. The period of time between the occurrence of two increment instructions is determined by the sum of the run times of the individual instructions to be executed between the increment instructions.

If potential synchronization positions corresponding to the increment instructions in actually equidistant intervals are desired, the run time of each individual instruction is determined during conversion of the instruction sequences of the programming language into the sequence of machine instructions, and the run time of a sequence of individual instructions is determined by adding up the run times of the individual instructions. On attaining a certain run time, in particular a run time preselected by the user, an increment instruction is inserted into the sequence of machine instructions. After an increment instruction, the run times of the individual instructions begin again to be added up from zero. However, for the reasons given above, it is always necessary to insert increment instructions before jump instructions. The increment instruction may be inserted before a jump instruction in addition to being inserted according to the fixed run time/spacing grid. As an alternative, however, it is possible to begin the run time or spacing count at zero after an increment instruction inserted before a jump instruction.

In addition, the increment instructions can also be inserted into the sequence of machine instructions or into the sequence of instruction sequences—hereinafter referred to as the source sequence—by testing the source sequence for certain machine instructions or certain instruction sequences, in particular for certain strings of machine instruction sequences or certain strings of instruction sequences—hereinafter referred to as search sequences.

If the search sequence is recognized within the source sequence, the increment instructions of the search sequence may be inserted at the beginning or at the end. The search sequence includes those elements of the source sequence to which an increment instruction is to be assigned according to the above instructions—i.e., at least block limits and/or jump instructions.

According to a specific embodiment, the increment instruction is inserted with the help of a special compiler. The conversion method of this special compiler differs from that of a standard compiler due to the fact that the language resources which define a block or a jump instruction, for example, are recognized and translated into the respective machine instructions and also into the increment instructions.

One alternative is a pre-processor. With the help of the pre-processor, the instruction sequences of a programming language can be pre-processed. With the help of a special syntax, which is known in principle to a programmer, such a pre-processor can be made to replace certain language resources of a programming language, e.g., language resources which introduce a block, with one language resource introducing such a block plus another language resource with which the increment instruction is initiated.

However, it would be desirable for the increment instructions to be inserted into the sequence of machine instructions in a manner that is transparent for the user. The instructions to the pre-processor described above can be recognized and thus manipulated by the user. However, manipulation could result in errors in synchronization and/or errors in the program generated itself. Therefore, another advantageous alternative for inserting the increment instructions into the sequence of instruction sequences is to use instead of the pre-processor a special pre-processor which converts at least the instruction sequences to which an increment instruction is to be assigned according to the above explanation into precisely these instruction sequences and the increment instruction, regardless of any other exchanges as per the instructions.

It is also possible through the above-mentioned alternatives for inserting the increment instructions, which essentially cannot be influenced by the user, for the user to insert the increment instructions himself into the sequence of machine instructions or into the sequence of instruction sequences.

DETAILED DESCRIPTION

Figure 1:
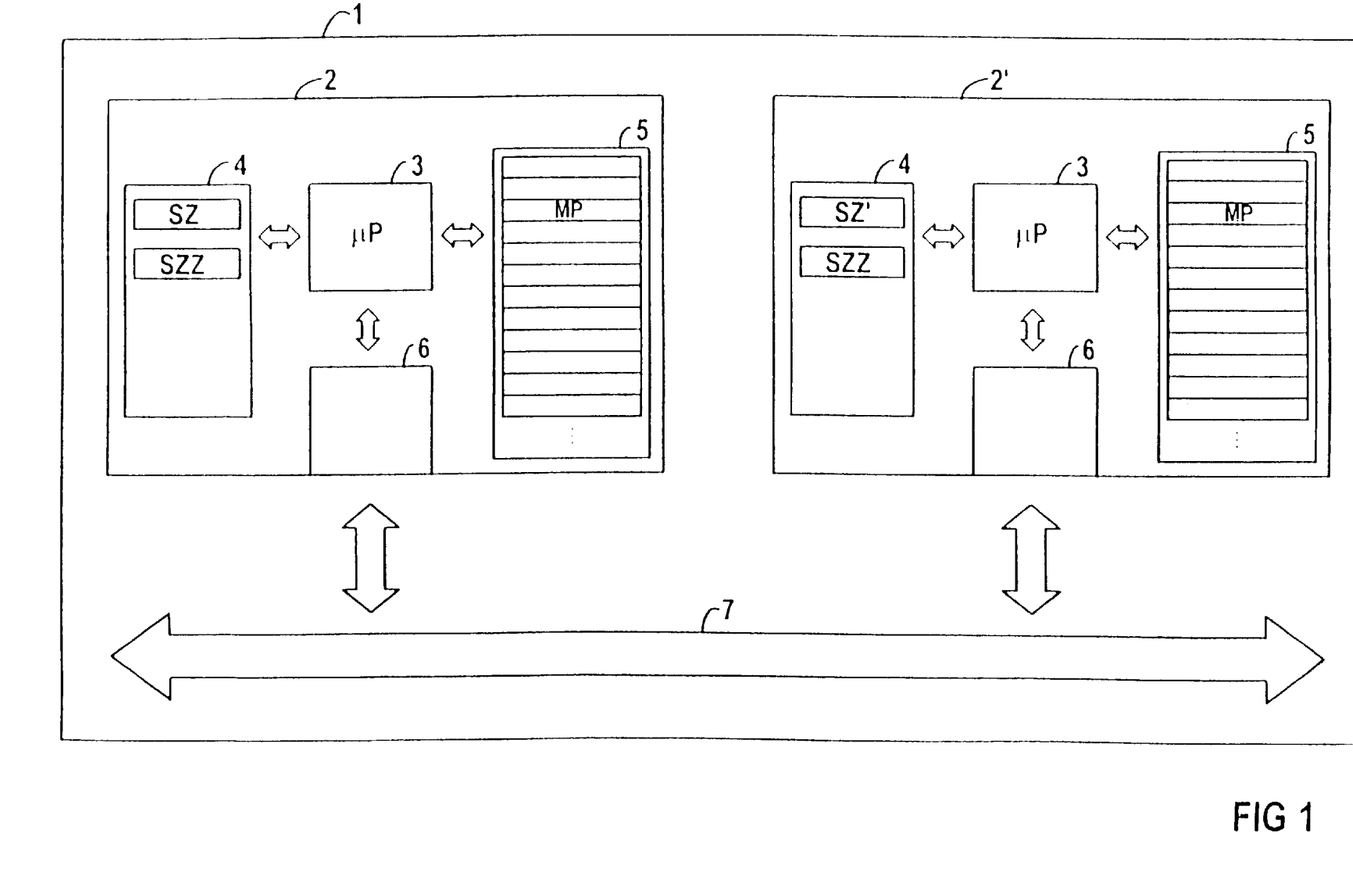
FIG. 1 shows a block diagram of an automation system.

As shown in FIG. 1, redundant automation system 1 is composed of at least two subsystems 2, 2' which can be connected to an industrial process for controlling and guiding an industrial process (not shown). Each subsystem 2, 2' has a processor 3, a data storage unit 4, an instruction sequence storage unit 5 plus at least one communication means 6. Data storage unit 4 and instruction sequence storage unit 5 are not necessarily separate units of redundant automation system 1.

The minimum of two subsystems 2, 2' communicate with one another and with the industrial process (not shown) via communication means 6 and a bus 7.

At least the value of synchronization counter SZ, SZ' and synchronization counter target value SZZ are stored in data storage unit 4. At least the sequence of machine instructions MP is stored in instruction sequence storage unit 5. The sequence of machine instructions MP is at least functionally identical for both subsystems 2, 2'. To control the industrial process (not shown), processor 3 of subsystems 2,2' executes the sequence of machine instructions MP of instruction sequence storage unit 5.

Figure 2:
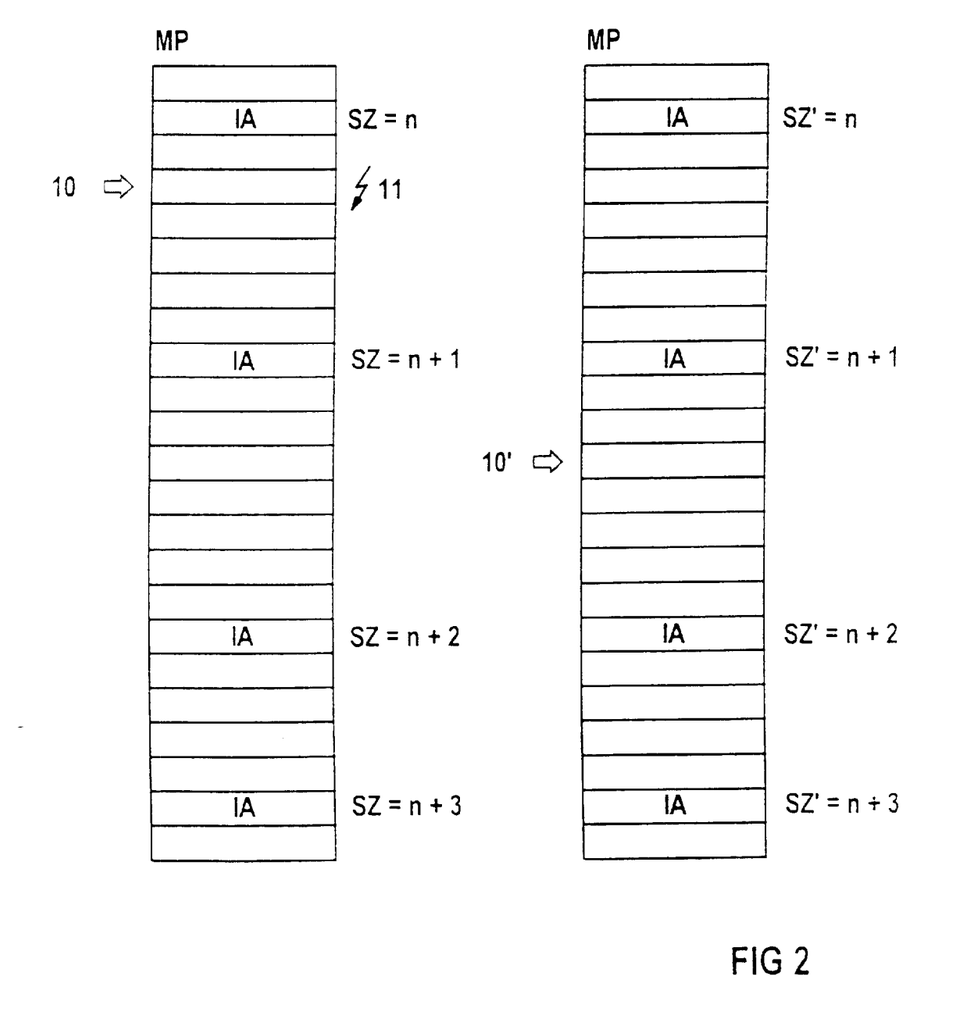
FIG. 2 shows the principle of the synchronization method.

FIG. 2 shows the sequences of machine instructions MP for the minimum of two subsystems 2, 2'. For example, assume that the sequence of machine instructions MP on the left side is the sequence of machine instructions MP for subsystem 2 and the sequence of machine instructions MP on the right side is the sequence of machine instructions MP for subsystem 2'.

As shown in FIG. 2, increment instructions IA are inserted into the sequences of machine instructions MP. With the help of increment instructions IA, synchronization counter SZ, SZ' of the respective subsystem 2, 2' is incremented, i.e., increased by 1. The positions indicated with arrow 10, 10' within the sequence of machine instructions MP each denote the machine instruction which is being executed momentarily at the time of occurrence of special event 11. As FIG. 2 also shows, at least one of subsystems 2, 2' registers special event 11.

in accordance with FIG. 2, subsystems 2, 2' are executing different machine instructions of the sequence of machine instructions MP. Processing of special event 11 at this time could, under some circumstances, result in inconsistent data of subsystems 2, 2' of automation system 1. Therefore, before processing special event 11, subsystems 2, 2' must be synchronized. For subsystem 2, synchronization counter SZ has value n at the time of occurrence of special event 11. For subsystem 2' synchronization counter SZ' already has value of n+1 at the time of occurrence of the special event.

For synchronization, subsystem 2, 2' which is ahead of at least one other subsystem 2, 2' in execution of the sequence of machine instructions MP must interrupt the execution of the sequence of machine instructions MP until the other subsystem 2, 2' has attained the corresponding position within the functionally identical sequences of machine instructions MP.

Increment instructions IA are always directly corresponding positions within the sequence of machine instructions MP. In the state illustrated in FIG. 2, synchronization counter SZ' has a value of n+1. Synchronization counter SZ has a value of n. If the execution of the sequence of machine instructions MP of subsystem 2' were stopped in this state, while execution of the sequence of machine instructions MP in subsystem 2 were to be continued until synchronization counter SZ also attained a value of n+1, no synchronization would nevertheless be achieved.

Next increment instruction IA, which both subsystems 2, 2' can attain at the same time, is therefore increment instruction IA at which both synchronization counter SZ and synchronization counter SZ' assume a value of n+2. The value of synchronization counter SZ, SZ', which both subsystems 2, 2' can attain together, is called synchronization counter target value SZZ. Synchronization position SP here corresponds to the position of increment instruction IA within the sequences of machine instructions MP at which the value of synchronization counter SZ, SZ' attains synchronization counter target value SZZ.

Figure 3:
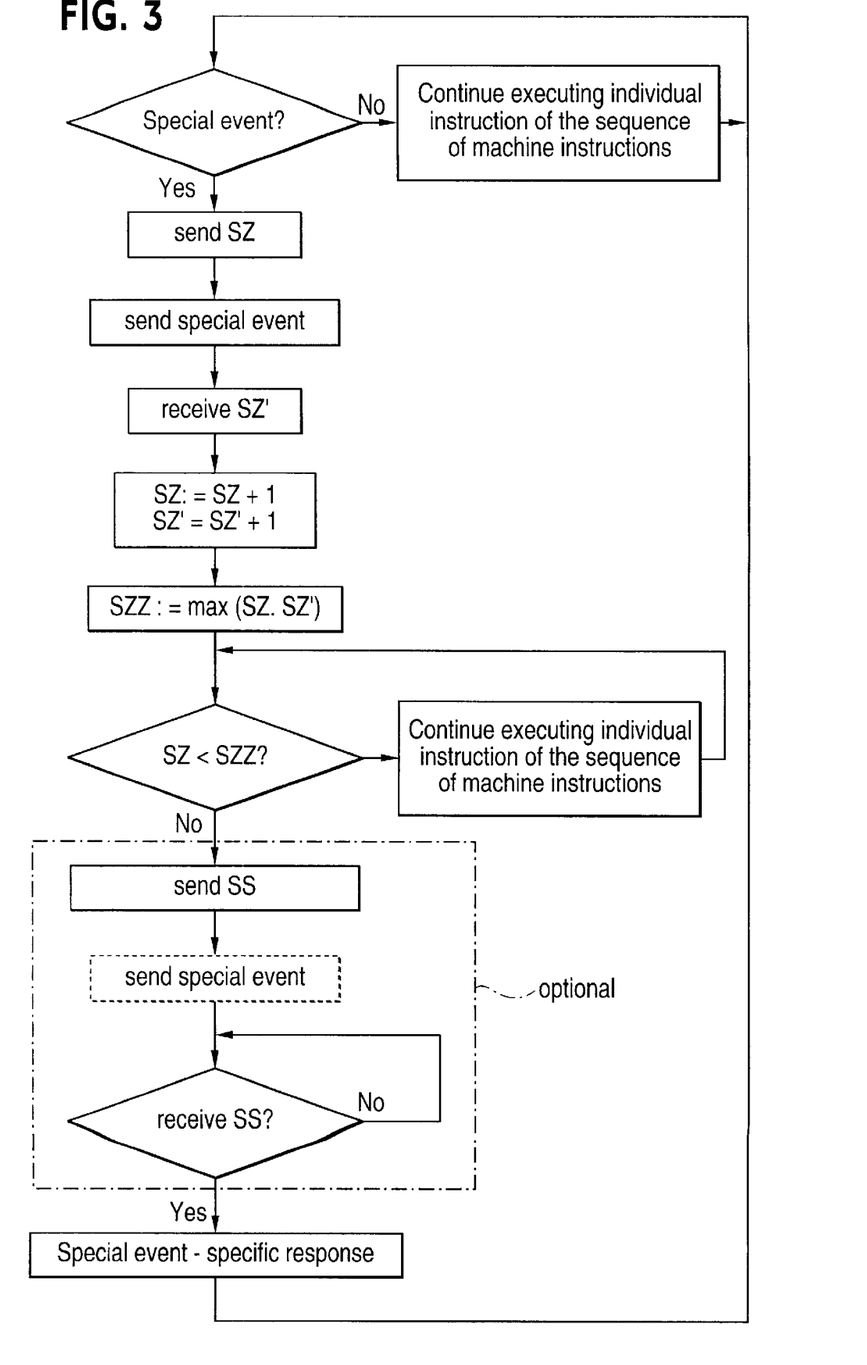
FIG. 3 shows a flow chart of the synchronization method.

After registering special event 11, alerted subsystem 2 according to FIG. 3 sends the value of its synchronization counter SZ as well as special event 11 to the minimum of one other subsystem 2' to determine synchronization counter target value SZZ. This is the earliest possible time to relay special event 11. The special event must be relayed at the latest in conjunction with the relaying of synchronization signal SS. Therefore, the minimum of one other subsystem 2' is informed about the occurrence of a special event 11 and sends in turn the instantaneous value of its synchronization counter SZ', which is received by alerted subsystem 2.

Thus, each subsystem 2, 2' knows the value of its own synchronization counter SZ and the value of synchronization counter SZ' of the minimum of one other subsystem 2, 2'. Synchronization counter target value SZZ is obtained from the maximum value of two incremented synchronization counters SZ, SZ'. As an alternative, it is also possible to first determine the maximum value and then determine synchronization counter target value SZZ by incrementing this maximum value.

Both subsystems 2, 2' continue executing the sequence of machine instructions MP after the exchange by synchronization counters SZ, SZ'. As soon as one subsystem 2, 2' has attained synchronization position SP in executing the sequence of machine instructions MP, it interrupts execution of the sequence of machine instructions MP. Attaining synchronization position SP can be recognized either by comparing the address of the momentarily executed instruction of the sequence of machine instructions MP with the address of synchronization position SP or by monitoring the value of synchronization counter SZ, SZ' for attaining synchronization counter target value SZZ, as shown in FIG. 3.

Each subsystem 2, 2' attaining synchronization position SP signals by relaying a synchronization signal SS to the minimum of one other subsystem 2, 2' that synchronization position SP has been attained. Alerted subsystem 2, 2' relays special event 11 to the minimum of one other subsystem 2, 2' immediately after registering special event 11 at the earliest and in conjunction with relaying synchronization signal SS at the latest.

Each subsystem 2, 2' determines a specific response for special event 11 and executes it as soon as it has attained synchronization position SP and has received synchronization signal SS from the minimum of one other subsystem 2, 2'. After executing the specific response for special event 11, subsystems 2, 2' continue the execution of the sequence of machine instructions MP after synchronization position SP.

As explained above, there are also cases in which it is not necessary to exchange or wait for synchronization signals SS in order to execute the response specific to special event 11. In such a case, the special event-specific response is carried out immediately on attaining synchronization position SP. Therefore, it should be pointed out explicitly that the blocks between the query "SZ<SZZ?" and execution of the "special event-specific response" in the flow chart according to FIG. 3 are optional. The optional section is omitted each time when no exact time synchronization is necessary, and instead it is sufficient for the special event-specific response not to be carried out at the same time but at functionally identical positions in the sequences of machine instructions MP.

According to an alternative embodiment of the synchronization method according to the present invention, decrement instructions IA are inserted instead of increment instructions IA into the sequence of machine instructions. In such a case, each of synchronization counters SZ, SZ' can be decremented, starting from a start value such as 32,767, just as synchronization counters SZ, SZ' were each previously incremented by 1, starting from 0. The synchronization method takes place by a fully analogous procedure using this synchronization counter SZ, SZ' which has now been decremented.

Figure 4:
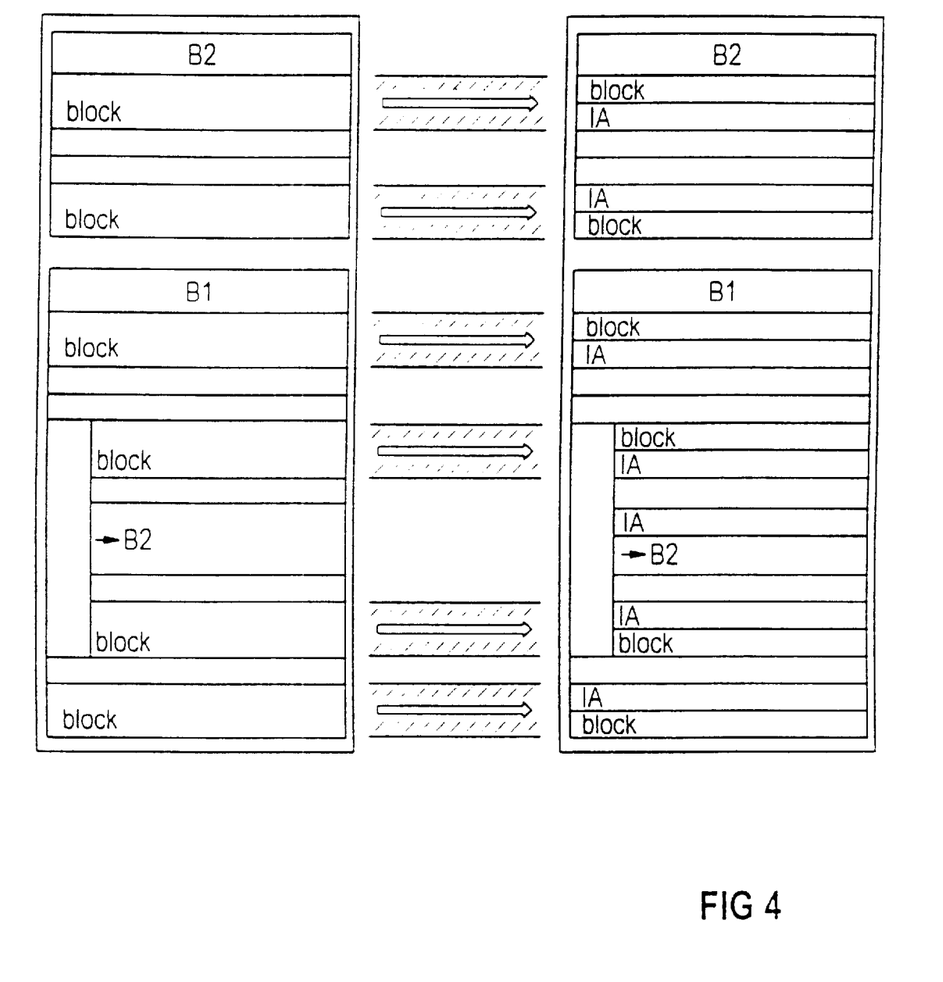
FIG. 4 shows the principle of the insertion method.

FIG. 4 shows the method of insertion of increment instructions IA using the example of instruction sequences of a programming language. In particular, for structured programming languages it has become standard to represent a program sequence in a structogram or structured chart. This structogram shows in particular the block limits and the structuring associated with them. A simple structogram is shown on the left side. The structogram has two blocks B1 and B2, with block B1, e.g., representing the main program while block B2 is an example of a subprogram.

The execution of the program begins in main program B1. Main program B1 and subprogram B2 each form a separate block. Therefore, they are embedded in block instructions. The block instruction at the beginning of main program B1 or subprogram B2 initiates the block, while the block instruction at the end of main program B1 and subprogram B2 ends the block. Other blocks may also occur within the instructions of a block, e.g., for instructions to be repeated several times, such as in loops. Subprogram B2 is called up from the internal block in main program B1.

The right side of FIG. 4 shows the resulting structogram with inserted increment instructions IA. Each block instruction initiating a block is transformed into a block instruction which initiates a block instruction and an increment instruction IA; each block instruction which ends a block is transformed into an increment instruction and a block instruction which ends a block. The sequence of block instruction and increment instruction IA is not limited to the sequence illustrated in FIG. 4 and may also vary. The instruction with which subprogram B2 is called up in the internal block of main program B1 is transformed into an increment instruction IA and an instruction with which subprogram B2 is called up.

Figure 5:
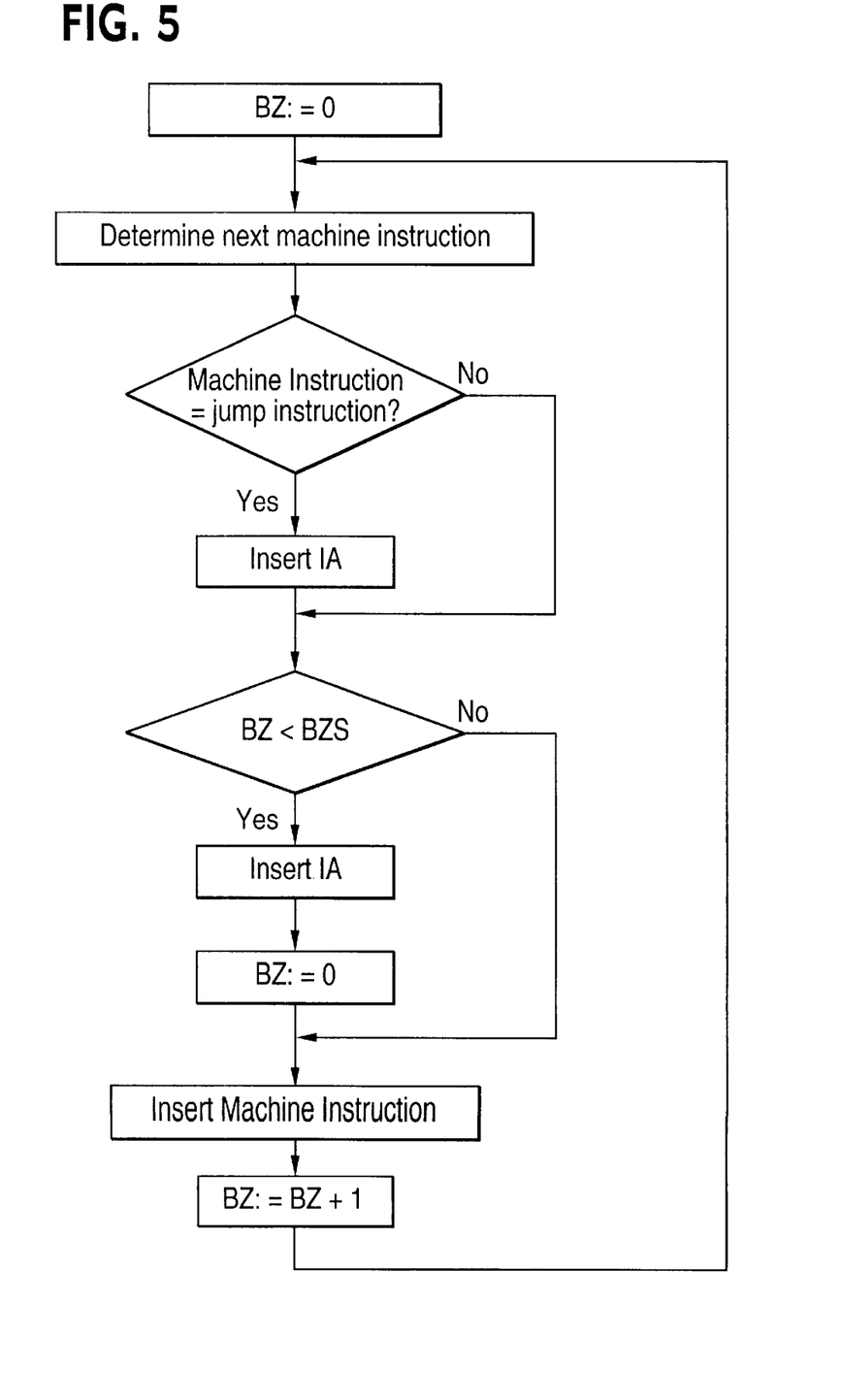
FIGS. 5 and 6 show a flow chart of the insertion method.
Figure 6:
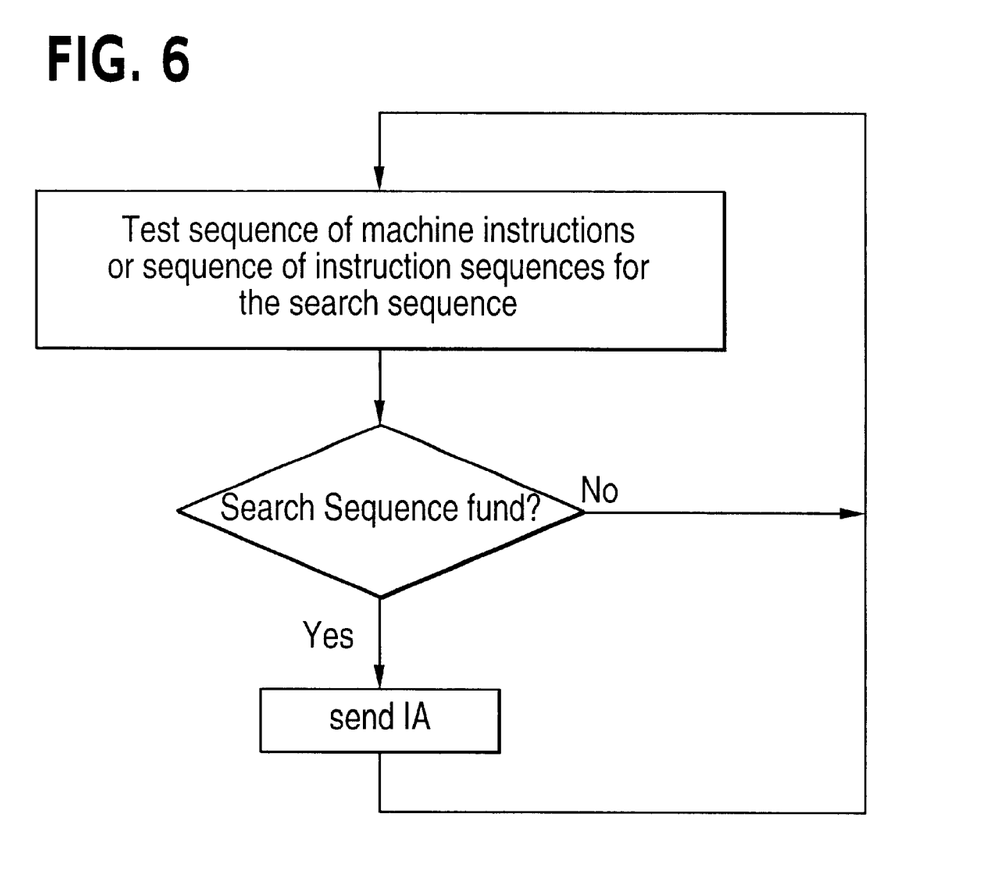

FIGS. 5 and 6 each show a flow chart of the insertion procedure.

FIG. 5 graphically shows the insertion procedure according to an exemplary embodiment of the present invention. First the value of instruction counter BZ is initialized, i.e., set to zero. Then the machine instruction that follows in the sequence of machine instructions MP at the moment is determined. Only when the machine instruction is a jump instruction is an increment instruction IA inserted into the sequence of machine instructions MP. Only when instruction counter BZ exceeds an instruction counter threshold BZS is an increment instruction IA inserted into the sequence of machine instructions MP and then instruction counter BZ is reset to zero. Then the machine instruction thus determined is inserted into the sequence of machine instructions MP. Following the insertion of the machine instruction, instruction counter BZ is incremented, i.e., increased by 1, because the number of machine instructions in the sequence of machine instructions MP has now increased by precisely one machine instruction. Processing is continued with determination of the next machine instruction until all machine instructions have been processed.

Instead of instruction counter BZ or instruction counter threshold BZS according to FIG. 5, a run time counter or a run time counter threshold may also be used. The run time counter is increased by the run time of the machine instruction inserted. The run time counter threshold indicates the run time between two increment instructions IA.

FIG. 6 shows the insertion method according to another exemplary embodiment of the present invention. which is based on a sequence of machine instructions MP or on a sequence of instruction sequences of a programming language through the interpretation of which a process, in particular an industrial process, is controlled. For inserting increment instructions IA, the sequence of machine instructions MP or the sequence of instruction sequences is tested for the occurrence of the search sequence. Only when the search sequence has been found within the sequence of machine instructions or the sequence of instruction sequences is an increment instruction inserted into it. The insertion procedure is continued with testing the sequence of machine instructions or the sequence of instruction sequences until they have been tested completely.

In conclusion, the meaning of the term "functionally identical" shall also be explained. Functionally identical sequences of machine instructions occur, for example, as a result of a compilation of instructions in different high-level languages which, however, are describing one and the same function. In addition, functionally identical sequence of machine instructions occur as a result of a compilation of instructions in a high-level language, which, however, have been converted by different compilers for this high-level language. Functionally identical sequences of machine instructions are obtained as the result of a compilation of instructions from one and the same high-level language describing the same function processed by one and the same compiler but with different parameters for this compiler, e.g., different optimization steps.

We claim:

1. A synchronization method for a redundant automation system, the redundant automation system including at least two subsystems, each of the at least two subsystems including at least one processor, the at least two subsystems being linked together by a communication arrangement and executing functionally identical sequences of machine instructions to control a process and being synchronized with one another via the communication arrangement, synchronization being performed at least when one of the at least two subsystems registers a special event, the synchronization method comprising the steps of:

relaying by each of the at least two subsystems an instantaneous value of a respective synchronization counter;

determining by each of the at least subsystems a synchronization counter target value as a function of the instantaneous value of the respective synchronization counter and as a function of the instantaneous value of a respective synchronization value of the respective synchronization counter of another of the at least two subsystems;

interrupting by each of the at least two subsystems the execution of the functionally identical sequences of machine instructions upon attaining a synchronization position within the functional identical sequences of machine instructions, the synchronization position being a value at which the respective synchronization counter attains the synchronization target value;

signaling with a synchronization signal by each of the at least two subsystems to the others of the at least two subsystems that the instantaneous target value has been attained;

determining by each of the at least two subsystems a response specific to the special event after attaining the synchronization position;

after the others of the at least two subsystems register the synchronization signal, carrying out the response by each of the at least two subsystems;

recommencing by each of the at least two subsystems the functionally identical sequences of machine instructions after the synchronization position; and relaying by the one of the at least two subsystems the special event to another of the at least two subsystems immediately after registering the special event, the special event being relayed, at the latest, in conjunction with the synchronization signal.

2. The synchronization method according to claim 1, further comprising the steps of:

assigning an unambiguous address to each machine instruction of the functionally identical sequences of machine instruction based on a position of each machine instruction within the functionally identical sequences of machine instructions;

determining the unambiguous address of a first instruction of the functionally identical sequences of machine instructions being carried out and the unambiguous address of a second instruction of the functionally identical sequences of machine instructions corresponding to the synchronization position; and while executing the functionally identical sequences of machine instructions, at least after the special event has been registered by the one of the at least two subsystems, continuously comparing the unambiguous address of the first instruction of the functionally identical sequences of machine instructions being carried to the unambiguous address of the second instruction of the functionally identical sequences of machine instructions corresponding to the synchronization position, wherein the execution of the functionally identical sequences of machine instructions is interrupted exactly on attaining the synchronization position.

3. The synchronization method according to claim 1, further comprising the step of:

during execution of the functionally identical sequences of machine instructions, at least after the special event is registered by the one of the at least two subsystems, continuously comparing by each of the at least two subsystems the value of the respective synchronization counter with the synchronization target counter value, wherein the execution of the functionally identical sequences of machine instructions is interrupted when the value of the respective synchronization counter attains the synchronization target counter value.

4. The synchronization method according to claim 1, further comprising the step of:

executing by each of the at least two subsystems an increment instruction, the increment instruction one of incrementing and decrementing the respective synchronization counter, the increment instruction being executed one of i) after a fixed number of individual instructions of the functionally identical machine instructions has been executed, and ii) at certain substantially equidistant run time intervals, run times of a number of machine instructions of the functionally identical machine instructions having been evaluated, the increment instruction further being executed in conjunction with a jump instruction.

5. The synchronization method according to claim 1, further comprising the step of:

inserting increment instructions into the functionally identical sequences of machine instructions, the increment instructions one of incrementing and decrementing the respective synchronization counter, the increment instructions being inserted one of i) after a fixed number of individual instructions of the functionally identical sequences of machine instructions, and ii) at certain substantially equidistant run time intervals, run times of a number of machine instruction of the functionally identical sequences of machine instructions having been evaluated, the increment instruction further being inserted in conjunction with each jump instruction.

6. The synchronization method according to claim 1, further comprising the steps of:

generating the functionally identical sequences of machine instructions from an instruction sequence of a programming language;

testing one of the functionally identical sequences of machine instructions and the instruction sequence for a search sequence, the search sequence being one of i) selected ones of machine instructions, and ii) selected ones of the instruction sequence;

recognizing an occurrence of the search sequence; and placing increment instructions one of before and after the search sequence, the increment instructions one of incrementing and decrementing the respective synchronization counter.

7. The synchronization method according to claim 6, further comprising the step of:

combining instruction sequences belonging together into a block, wherein the search sequence is at least one of limits of the block and a jump instruction.

8. The synchronization method according to claim 7, further comprising the steps of:

inserting the increment instructions into the functionally identical sequences of machine instructions while the functionally identical sequences of machine instructions are being generated, the functionally identical machine instructions being generated using a compiler, the compiler generating the increment instructions on recognizing the search sequence and inserting the increment instructions into the functionally identical sequences of machine instructions.

9. The synchronization method according to claim 7, further comprising the steps of:

inserting the increment instructions into the functionally identical sequences of machine instructions at least one of before and after the functionally identical sequences of machine instructions are generated, the functionally identical sequence of machine instructions being generated using a compiler, the increment instructions being inserted into the functionally identical sequences of machine instructions upon recognizing the search sequence.

10. A synchronization method for a redundant automation system having subsystems in communication with each other and executing functionally identical sequences of machine instructions to control a process, said synchronization method comprising assigning an unambiguous address to each machine instruction of the functionally identical sequences based on a position of each machine instruction within the functionally identical sequences;

detecting and registering a special event by an alerted subsystem;

relaying an instantaneous value of a synchronization counter in each subsystem to another subsystem, starting with the alerted subsystem;

determining by each subsystem a synchronization position based on the instantaneous value of the synchronization counter therein and the instantaneous value of the synchronization counter in a different subsystem;

determining the unambiguous address of a first instruction of the machine instructions being carried out and the unambiguous address of a second instruction of the machine instructions corresponding to the synchronization position;

while executing the functionally identical sequences of machine instructions, at least after the special event has been registered by the alerted subsystem, continuously comparing the unambiguous address of the first instruction of the machine instructions being executed to the unambiguous address of the second instruction of the machine instructions corresponding to the synchronization position;

interrupting execution of the functionally identical sequences of machine instructions by each subsystem exactly on attaining the synchronization position;

relaying the special event from the alerted subsystem to each other subsystem;

determining and producing by each subsystem a specific response to the special event; and recommencing after the synchronization position the execution of the functionally identical sequences of machine instructions by each subsystem after production of the specific response.

11. A synchronization method for a redundant automation system having subsystems in communication with each other and executing functionally identical sequences of machine instructions to control a process, said synchronization method comprising:

executing, by each subsystem, an increment instruction to one of increment and decrement a synchronization counter, the increment instruction being executed one of (i) after a fixed number of individual instructions of the machine instructions has been executed, and (ii) at certain substantially equidistant run time intervals, based on evaluation of run times of a number of the functionally identical machine instructions, the increment instruction further being executed in conjunction with a jump instruction:

detecting and registering a special event by an alerted subsystem;

relaying an instantaneous value of the synchronization counter in each subsystem to another subsystem, starting with the alerted subsystem;

determining by each subsystem a synchronization target value based on the instantaneous value of the synchronization counter therein and the instantaneous value of the synchronization counter in a different subsystem;

interrupting execution of each subsystem at a synchronization position within the functionally identical sequences of machine instructions when the synchronization counter attains the synchronization counter target value;

relaying the special event from the alerted subsystem to each other subsystem;

determining and producing by each subsystem a specific response to the special event;

recommencing after the synchronization position the execution of the functionally identical sequences of machine instructions by each subsystem after production of the specific response.

12. A synchronization method for a redundant automation system having subsystems in communication with each other and executing functionally identical sequences of machine instructions to control a process, said synchronization method comprising:

inserting increment instructions into the functionally identical sequences of machine instructions, the increment instructions one of incrementing and decrementing a synchronization counter, the increment instructions being inserted one of (i) after a fixed number of individual instructions of the functionally identical sequences of machine instructions, and (ii) at certain substantially equidistant run time intervals, run times of a number of machine instruction of the functionally identical sequences of machine instructions having been evaluated, the increment instruction further being inserted in conjunction with each jump instruction:

detecting and registering a special event by an alerted subsystem;

relaying an instantaneous value of the synchronization counter in each subsystem to another subsystem, starting with the alerted subsystem;

determining by each subsystem a synchronization target value based on the instantaneous value of the synchronization counter therein and the instantaneous value of the synchronization counter in a different subsystem;

interrupting execution of each subsystem at a synchronization position within the functionally identical sequences of machine instructions when the synchronization counter attains the synchronization counter target value;

relaying the special event from the alerted subsystem to each other subsystem;

determining and producing by each subsystem a specific response to the special event;

recommencing after the synchronization position the execution of the functionally identical sequences of machine instructions by each subsystem after production of the specific response.

13. A synchronization method for a redundant automation system having subsystems in communication with each other and executing functionally identical sequences of machine instructions to control a process, said synchronization method comprising a synchronization counter;

generating the functionally identical sequences of machine instructions from an instruction sequence of a programming language;

testing one of the functionally identical sequences of machine instructions and the instruction sequence for a search sequence, the search sequence being one of (i) selected ones of machine instructions, and (ii) selected ones of the instruction sequence;

recognizing an occurrence of the search sequence;

placing increment instructions one of before and after the search sequence, the increment instructions one of incrementing and decrementing a synchronization counter;

detecting and registering a special event by an alerted subsystem;

relaying an instantaneous value of the synchronization counter in each subsystem to another subsystem, starting with the alerted subsystem;

determining by each subsystem a synchronization target value based on the instantaneous value of the synchronization counter therein and the instantaneous value of the synchronization counter in a different subsystem;

interrupting execution of each subsystem at a synchronization position within the functionally identical sequences of machine instructions when the synchronization counter attains the synchronization counter target value;

relaying the special event from the alerted subsystem to each other subsystem;

determining and producing by each subsystem a specific response to the special event;

recommencing after the synchronization position the execution of the functionally identical sequences of machine instructions by each subsystem after production of the specific response.

14. The synchronization method according to claim 13, further comprising the step of:

combining instruction sequences belonging together into a block, wherein the search sequence is at least one of limits of the block and a jump instruction.

15. The synchronization method according to claim 14, further comprising the step of:

combining instruction sequences belonging together into a block, wherein the search sequence is at least one of limits of the block and a jump instruction.

16. The synchronization method according to claim 15, further comprising the steps of:

inserting the increment instructions into the functionally identical sequences of machine instructions while the functionally identical sequences of machine instructions are being generated, the functionally identical machine instructions being generated using a compiler, the compiler generating the increment instructions on recognizing the search sequence and inserting the increment instructions into the functionally identical sequences of machine instructions.

17. The synchronization method according to claim 15, further comprising the steps of:

inserting the increment instructions into the functionally identical sequences of machine instructions at least one of before and after the functionally identical sequences of machine instructions are generated, the functionally identical sequence of machine instructions being generated using a compiler, the increment instructions being inserted into the functionally identical sequences of machine instructions upon recognizing the search sequence.

18. A synchronization method for a redundant automation system having subsystems in communication with each other and executing functionally identical sequences of machine instructions to control a process, said synchronization method comprising:

detecting and registering a special event by an alerted subsystem;

relaying an instantaneous value of a synchronization counter in each subsystem to another subsystem, starting with the alerted subsystem;

determining by each subsystem a synchronization target value based on the instantaneous value of the synchronization counter therein and the instantaneous value of the synchronization counter in a different subsystem;

interrupting execution of each subsystem at a synchronization position within the functionally identical sequences of machine instructions when the synchronization counter attains the synchronization counter target value;

relaying the special event from the alerted subsystem to each other subsystem;

determining by each subsystem a specific response to the special event;

relaying a synchronization signal from each subsystem to another subsystem upon attainment of the synchronization counter target value by the synchronization counter;

producing the specific response by each subsystem upon receiving the synchronization signal from all of at least one other subsystem; and recommencing after the synchronization position the execution of the functionally identical sequences of machine instructions by each subsystem after production of the specific response.

19. A method according to claim 18, wherein said relaying of the special event occurs during a time period between said relaying of the instantaneous value of the synchronization counter from the alerted subsystem and said relaying of the synchronization signal from the alerted subsystem.

20. A synchronization method for a redundant automation system having subsystems in communication with each other and executing functionally identical sequences of machine instructions to control a process, said synchronization method comprising:

incrementing a synchronization counter in each subsystem upon execution of each jump instruction in the functionally identical sequences of machine instructions;

detecting and registering a special event by an alerted subsystem;

relaying from each subsystem an instantaneous value of the synchronization counter to another subsystem, starting with the alerted subsystem;

determining by each subsystem a synchronization target value based on the instantaneous value of the synchronization counter therein and the instantaneous value of the synchronization counter in a different subsystem;

interrupting execution of each subsystem at a synchronization position within the functionally identical sequences of machine instructions when the synchronization counter attains the synchronization counter target value;

relaying the special event from the alerted subsystem to each other subsystem;

determining and producing by each subsystem a specific response to the special event;

recommencing after the synchronization position the execution of the functionally identical sequences of machine instructions by each subsystem after production of the specific response.

21. A method according to claim 20, wherein said incrementing is further performed upon execution of a predetermined number of the machine instructions.

22. A method according to claim 20, wherein said incrementing is further performed at substantially equidistant run time intervals based on run times of a number of the functionally identical sequences of machine instructions evaluated prior to beginning operation of the redundant automation system.

23. A method according to claim 20, further comprising automatically inserting increment instructions immediately prior to each jump instruction in the functionally identical sequences of machine instructions prior to beginning execution thereof, and wherein said incrementing is performed by the increment instructions.

* * * * *

UNITED STATES PATENT AND TRADEMARK OFFICE
CERTIFICATE OF CORRECTION

PATENT NO. : 6,356,795 B1
DATED : March 12, 2002
INVENTOR(S) : Herbert Barthel et al.

It is certified that error appears in the above-identified patent and that said Letters Patent is hereby corrected as shown below:

<u>Title page,</u>
Change item [73], Assignee from "Seimens Aktiengesellschaft" to -- Siemens Aktiengesellschaft --

Signed and Sealed this

Twenty-third Day of July, 2002

Attest:

Attesting Officer

JAMES E. ROGAN
*Director of the United States Patent and Trademark Office*